United States Patent
Dargaud et al.

(10) Patent No.: US 6,645,288 B1
(45) Date of Patent: Nov. 11, 2003

(54) CEMENTING COMPOSITIONS AND APPLICATION OF SUCH COMPOSITIONS FOR CEMENTING OIL WELLS OR THE LIKE

(75) Inventors: Bernard Dargaud, Elancourt (FR); Sylvaine Le Roy-Delage, Paris (FR); Marc Thiercelin, Ville d'Avray (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/868,390

(22) PCT Filed: Dec. 10, 1999

(86) PCT No.: PCT/EP99/09800
§ 371 (c)(1),
(2), (4) Date: Jun. 18, 2001

(87) PCT Pub. No.: WO00/37387
PCT Pub. Date: Jun. 29, 2000

(30) Foreign Application Priority Data

Dec. 21, 1998 (FR) .............................. 98 16104

(51) Int. Cl.⁷ .............................................. C04B 16/04
(52) U.S. Cl. ..................... 106/696; 106/724; 106/727; 106/823
(58) Field of Search .................. 106/724, 727, 106/823, 696

(56) References Cited

U.S. PATENT DOCUMENTS

| | | | |
|---|---|---|---|
| 3,272,765 A | * 9/1966 | Sefton | |
| 3,804,058 A | * 4/1974 | Messenger | |
| 3,902,911 A | * 9/1975 | Messenger | |
| 5,580,378 A | * 12/1996 | Shulman | ...................... 106/677 |
| 5,622,556 A | * 4/1997 | Shulman | ...................... 106/677 |
| 5,725,652 A | * 3/1998 | Shulman | ...................... 106/677 |
| 5,779,787 A | 7/1998 | Brothers et al. | ............ 106/802 |
| 6,153,562 A | * 11/2000 | Villar et al. | ................ 507/269 |
| 6,308,777 B2 | * 10/2001 | Chatterji et al. | ............. 166/293 |

FOREIGN PATENT DOCUMENTS

| | | | |
|---|---|---|---|
| EP | 0 566 012 A1 | 10/1993 | |
| JP | 63159272 | * 7/1988 | |
| JP | 2000007409 | * 1/2000 | |

OTHER PUBLICATIONS

Abstract No. 26310z, Rakhmatullin, T. K., et al., "Cementing of Deep Wells Associated with Absorbing Strata", [Razved. Okhr. Nedr., (7) 34–7, 1987, in Russian] Chemical Abstracts, vol. 108, No. 4, Jan. 25, 1998.

* cited by examiner

Primary Examiner—Paul Marcantoni
(74) Attorney, Agent, or Firm—Catherine Menes; Brigitte Jeffery; John Ryberg (57) ABSTRACT

The present invention provides cementing compositions for oil wells or the like comprising an hydraulic binder and reinforcing particles constituted by a flexible material of low compressibility, and with an average grain size of less than 500 μm.

The compositions of the invention are of particular advantage when cementing zones which are subjected to extreme dynamic stresses, such as perforation zones and the junctions of a multi-branch lateral well. They are also highly suitable for producing plugs.

14 Claims, 4 Drawing Sheets

CEMENTING COMPOSITIONS AND APPLICATION OF SUCH COMPOSITIONS FOR CEMENTING OIL WELLS OR THE LIKE

The present invention relates to techniques for drilling oil, gas, water, or geothermal wells or the like. More precisely, the invention relates to cementing compositions which are particularly suitable for cementing zones which are subjected to extreme dynamic stresses.

In general, a well which is over a few hundred meters deep is cased and the annular space between the subterranean formation and the casing is cemented over all or part of its depth. Cementing essentially prevents the exchange of fluid between the different layers of formation traversed by the hole and controls the ingress of fluid into the well, and in particular limits the ingress of water. In production zones, the casing—and the cement and the formation—is perforated over a height of several centimeters.

The cement placed in the annular space-of an oil well is subjected to a number of stresses throughout the lifetime of the well. The pressure inside a casing can increase or decrease because the fluid which fills it can change or because a supplemental pressure is applied to the well, for example when the drilling fluid is replaced by a completion fluid, or during a stimulation operation. A change in temperature also creates stress in the cement, at least during the transition period preceding temperature equilibration between the steel and the cement. In the majority of the above cases, the stress event is sufficiently slow for it to be treated as a static event.

However, the cement is subject to other stresses which are dynamic in nature, either because they are produced over a very short period or because they are either periodic or repetitive in nature. Perforations create an over-pressure of several hundred bars inside a well which is dissipated in the form of a shock wave. Further, perforations create a shock when the projectile penetrates the cement and that shock subjects the zone surrounding the hole to large forces over a depth of several meters.

A further event, which is now routine in oil well operations and which creates dynamic stresses in the cement, is the opening of a window in a casing which is already cemented to create a multi-branch lateral well. Milling the steel over a depth of several meters followed by drilling a lateral well subjects the cement to shocks and vibrations which frequently damage it irreparably.

The present invention aims to provide novel formulations, in particular for cementing regions of oil wells or the like which are subjected to extreme dynamic stresses.

In an article presented at the SPE (Society of Petroleum Engineers) annual technical conference and exhibition of 1997, Marc Thiercelin et al. (SPE 38598, Oct. 5–8, 1997)— and French patent application FR-A-97 11821 of Sep. $23^{rd}$, 1997, demonstrated that the risk of rupture of a cement sleeve depends on the thermoelastic properties of the casing, the cement and the formation surrounding the well. A detailed analysis of the mechanisms leading to rupture of the cement sleeve has shown that the risk of rupture of a cement sleeve following an increase in pressure and/or temperature in the well is directly linked to the tensile strength of the cement and is attenuated when the ratio between the tensile strength $R_T$ of the cement and its Young's modulus E is increased.

Young's modulus is known to characterize the flexibility of a material. To increase the $R_T/E$ ratio, it is advantageous to select materials with a low Young's modulus, in other words to select very flexible materials.

One known means for increasing the flexibility of a hardened cement is to reduce the density of the slurry by extending it with water. However, that leads to a degradation in the stability of the slurry, in particular with separation of the solid and liquid phases. Such phenomena can, of course, be controlled in part by adding materials such as sodium silicate, but the permeability of the hardened cement is nevertheless very high, which means that it cannot-fulfill its primary function of isolating zones to prevent fluid migration, or at least it cannot guarantee its long-term isolation. Further, lightened cements have lower strength, in particular lower shock resistance, which constitutes a clear handicap for cements intended for use in zones which are subjected to extreme mechanical stresses such as perforation zones.

In the building field, incorporating particles of rubber into a concrete is known to result in better resilience, durability and elasticity (see, for example, A. B. Sinouci, Rubber-Tire Particles as Concrete Aggregate, Journal of Materials in Civil Engineering, 5, 4, 478–497 (1993)]. Concretes which include rubber particles in their formulation can be used, for example, in highway construction to absorb shocks, in anti-noise walls as a sound insulator and also in constructing buildings to absorb seismic waves during earthquakes. In such applications, the mechanical properties in particular are improved.

In the field of oil well cementing, it is also known [Well Cementing 1990, E. B. Nelson, Schlumberger Educational Services] that adding ground rubber particles (grain size in the range 4–20 mesh) can improve the impact strength and bending strength. Such an improvement in mechanical properties has also been indicated in Russian patents SU-1384724 and SU-1323699. More recently, United States patent U.S. Pat. No. 5,779,787 has proposed the use of particles derived from recycled automobile tires with grain size in the range 10/20 or 20/30 mesh, to improve the mechanical properties of hardened cements, in particular to improve their elasticity and ductility.

The present invention aims to provide oil well cements reinforced with flexible particles, of low compressibility, with low density and with an average size not exceeding 500 µm.

The term "flexible particles" means particles made of a material having a Young's modulus of less than 5000 MPa, preferably less than 3000 MPa, more preferably less than 2000 MPa. The elasticity of the materials selected for these flexible particles is thus at least four times greater than that of cement and more than thirteen times that of the silica usually used as an additive in oil well cements.

The flexible particles added to the cementing compositions of the invention are also remarkable because of their low compressibility and are characterized by a Poisson ratio of over 0.3.

In order to lighten the slurry, it is also important for the density of the flexible particles to be less than 1.5 g/cm$^3$, preferably less than 1.2 g/cm$^3$, more preferably less than 1 g/cm $^3$. Preferably, this low density is intrinsic in the choice of the constituent materials and not by dint of high porosity or hollow particles. Preferably again, materials of low porosity are used.

Further, the particles must be insoluble in an aqueous medium which may be saline, and must be capable of resisting a hot basic medium, since the pH of a cementing slurry is generally close to 13 and the temperature in a well is routinely over 100° C.

Regarding particle size, essentially isotropic particles are preferred. Spherical or near spherical particles may be synthesized directly, but usually the particles are obtained by grinding, in particular cryo-grinding. The average particle size is generally in the range 80 μm to 500 μm, preferably in the range 100 μm to 400 μm. Particles which are too fine, or on the other hand too coarse, are difficult to incorporate into the mixture or result in pasty'slurries which are unsuitable for use in an oil well.

Particular examples of materials which satisfy the various criteria cited above are thermoplastics (polyamide, polypropylene, polyethylene, . . . ) or other polymers such as styrene divinylbenzene or styrene butadiene (SBR). Recycled products are generally not preferred because of the variability in supply sources and in physico-chemical properties.

In addition to the flexible particles of the invention, the cementing compositions of the invention comprise a hydraulic binder, in general based on Portland cement and water. Depending on the specifications regarding the conditions for use, the cementing compositions can also be optimized by adding additives common to the majority of cementing compositions, such as suspension agents, dispersing agents, anti-foaming agents, expansion agents (for example magnesium oxide), fine particles, fluid loss control agents, gas migration control agents, retarders or setting accelerators. Thus the systems are either bimodal in type, the solid fraction of the slurry being constituted by a mixture of cement and flexible particles, or they can comprise three (trimodal), or more types of solid constituents, the solid mixture comprising fine micronic particles and possibly submicronic particles in addition to the cement and flexible particles.

The volume of flexible particles represents between 5% and 40% of the total volume of the cementing slurry, preferably between 10% and 35%, and preferably again, between 15% and 30% of the total slurry volume.

The formulations of the invention are preferably based on Portland cements in, classes A, B, C, G and H as defined in Section 10 of the American Petroleum Institute's (API) standards. Classes G and H Portland cements are particularly preferred but other cements which are known in this art can also be used to advantage. For low-temperature applications, aluminous cements and Portland/plaster mixtures (deepwater wells, for example) or cement/silica mixtures (for wells where the temperature exceeds 120° C., for example) can be used.

The water used to constitute the slurry is preferably water with a low mineral content such as tap water. Other types of water, such as seawater, can possibly be used but this is generally not preferable.

These particles with low density with respect to the cement can reduce the density of the slurry and result in lower permeability and better impact resistance. It also affects the flexibility of the system, since adding flexible particles produces cements with a lower Young's modulus.

The compositions comprising flexible particles of the invention have remarkable mechanical properties which render them particularly suitable for cementing in areas of an oil well which are subjected to extreme stresses, such as perforation zones, junctions for branches of a lateral well or plug formation.

BRIEF DESCRIPTION OF THE DRAWINGS

The present invention illustrated below in the following examples, along with the enclosed drawings that show.

The present invention is illustrated below in the following examples.

EXAMPLE 1

Formulations for Cement Slurries with Styrene Divinylbenzene Particles

In this example, particles of styrene divinylbenzene (STDVB) with grain size in the range 45–100 mesh (355 μm–150 μm) were tested.

The cement slurries were composed of Portland Dyckerhoff North class G cement, styrene divinylbenzene particles, water, a dispersing agent and a retarder. The formulations and properties of the cement slurry are given in Tables 1 to 3; they were all optimized to the same temperature (76.7° C.—170° F.); two cement slurry densities ρ were selected (1.677 g/cm$^3$—14 ppg and 1.431 g/cm$^3$—12 ppg). The dispersing agent was a polynaphthalene sulfonate; the retarder was a lignosulfonate.

TABLE 1

Formulations for cement slurries with STDVB particles

| Slurry n° | STDVB % bwoc | STDVB % vol | Dispersing agent gps | Retarder gps | ρ g/cm$^3$ | Porosity of slurry φ |
|---|---|---|---|---|---|---|
| A1 | 27.8 | 24.8 | 0.012 | 0.06 | 1.666 | 45% |
| A2 | 50.9 | 30.0 | 0.014 | / | 1.450 | 50% | bwoc is the abbreviation for "by weight of cement";
% vol corresponds to the volume of flexible particles in the slurry (aqueous and solid phases);
gps is the abbreviation for "gallons per sack", namely 3.78541 liters per sack of 42.637 kilograms (kg) of cement, in other words, 1 gps = 0.0888 liters (1) of additive per kg of Portland cement.

The rheology of the cement slurry and the free water were measured using the procedure recommended in API 10 (American Petroleuim Institute). At laboratory temperature, the rheology was measured immediately after mixing and after 20 minutes of conditioning to temperature. The results are shown in Table 2. The rheology of a slurry is characterized by its,plastic viscosity PV (in cP or mPa.s), the conversion factor being equal to 1) and the yield point or Ty (in 1 bf/100 ft$^2$, conversion to Pascals being obtained by multiplying by 0.478803), assuming the slurry to be a Bingham fluid.

TABLE 2

Rheology and free water for systems with STDVB particles

| Formulation | Rheology after mixing at laboratory temperature | | Rheology after conditioning at 76.6° C. | | Free water after 2 hours (ml) |
|---|---|---|---|---|---|
| | PV (mPa.s) | Ty (lbf/100 ft$^2$) | PV (mPa.s) | Ty (lbf/100 ft$^2$) | |
| A1 | 35.4 | 3.0 | 66.4 | 7.2 | 2 |
| A2 | 24.5 | 4.1 | 40.7 | 20.3 | 0 |

The development of the compressive strength during setting of the cement was evaluated by UCA (Ultrasonic Cement Analyzer) measurements. These measurements enabled the setting time required to produce a given strength (0.34 MPa—50 psi and 3.4 MPa=500 psi) and the compressive strength Rt obtained after a given time (72 hours) at a pressure of 3000 psi (20.7 MPa) to be determined.

TABLE 3

UCA and setting time at T = 76.6° C. for systems with STDVB particles

| N° | Time to 0.34 MPa at T (min) | Time to 3.4 MPa at T (min) | Compressive strength after 72 hours (psi) | Setting time (min) |
|---|---|---|---|---|
| A1 | 970 | 1088 | 3000 | 270 |
| A2 | 171 | 383 | 1167 | 210 |

EXAMPLE 2

Formulations for Cement Slurries with Polyamide Particles

The cement slurries were principally composed of Portland Dyckerhoff North class G cement, polyamide particles, water, a dispersing agent, a retarder and an anti-foaming agent.

A number of polyamides were tested: Nylon 6, Nylon 12 and a polyamide 11, the principal characteristics of which are shown in Table 4.

TABLE 4

Characteristics of test polyamides

| Source | Supplier | Product name | Polyamide | Average grain size (μm) | ρ (g/cm$^3$) |
|---|---|---|---|---|---|
| 1 | Goodfellow | AM306015 | Nylon 6 | 350 | 1.13 |
| 2 | Goodfellow | AM306010 | Nylon 6 | 15–20 | 1.13 |
| 3 | Elf Atochem | Rilsan | 11 | 100 | 1.0 |
| 4 | Huls | Vestosint 1111 | Nylon 12 | 100 | 1.06 |

The formulations and properties of the cement slurry are shown in Tables 5 to 9. They were all formulated at the same temperature (76.7° C.—170° F.), the same slurry density (14 ppg), and different grain sizes were studied. The dispersing agent used was a polynaphthalene sulfonate; the retarder was a lignosulfonate. The fine particles used for test B2 was filtered fly ash, a detailed description of which is given in French patent FR-A-96 1176. The magnesium oxide added for test B5 acted as an expansion agent.

TABLE 5

Cement slurry with polyamide particles-list of formulations

| N | Description of solid fraction | Polyamide source |
|---|---|---|
| B1 | Bimodal mixture: cement + polyamide | 1 |
| B2 | Trimodal mixture: cement + polyamide + fine particles | 1 |
| B3 | Trimodal mixture: cement + nylon 350 μm + nylon 15–20 μm | 1 and 2 |
| B4 | Bimodal mixture: cement + polyamide | 3 |
| B5 | Bimodal mixture: cement + polyamide + magnesium oxide | 1 |
| B6 | Bimodal mixture: cement + polyamide | 4 |

It should be noted that it was not possible to prepare a slurry with source 2 alone as the slurry was too viscous even with a low concentration of reinforcing particles.

TABLE 6

Formulations for cement slurries with polyamide particles

| | Polyamides | | Fine | Dispersing | Retarder | Anti-foaming | ρ | |
|---|---|---|---|---|---|---|---|---|
| | % bwoc | % vol | % bvob | agent gps | gps | agent gps | g/cm$^3$ | φ |
| B1 | 29.4 | 24.8 | / | / | 0.097 | / | 1.67 | 45% |
| B2 | 22.8 | 19.3 | 10 | 0.026 | 0.051 | 0.037 | 1.75 | 45% |
| B3 | 22.8 | 24.8 | 10 | 0.018 | 0.073 | / | 1.67 | 45% |
| B4 | 17.8 | 16.8 | / | / | 0.066 | 0.033 | 1.67 | 52% |
| B6 | 18.1 | 16.7 | / | / | 0.067 | 0.033 | 1.67 | 52% |

TABLE 7

Formulation for cement slurry with polyamide particles and an expansion agent

| | Polyamides % bwoc | Expansion agent % bwoc | Dispersing agent gps | Retarder gps | Anti-foaming agent gps | Extension agent gps | ρ g/cm$^3$ | φ |
|---|---|---|---|---|---|---|---|---|
| B5 | 24.9 (22.6% vol) | 5 | 0.059 | 0.176 | 0.035 | 0.106 | 1.77 | 45% |

TABLE 8

Rheology and free water for systems with polyamide particles

| Formulation | Rheology after mixing at laboratory temperature PV (mPa.s) | Ty (lbf/ 100 ft²) | Rheology after conditioning at 76.6° C. PV (mPa.s) | Ty (lbf/ 100 ft²) | Free water after 2 hours (ml) |
|---|---|---|---|---|---|
| B1 | 156.2 | 1.0 | 118.9 | 17.0 | 1.5 |
| B2 | 203.9 | 26.6 | 215.4 | 35.4 | 2.0 |
| B3 | 475.8 | 13.6 | 294.6 | 26.5 | 0 |
| B4 | 47.7 | 4.4 | 34.4 | 30.2 | 3.0 |
| B5 | 230.5 | 1.0 | 48.9 | 26.4 | 0.5 |
| B6 | 48.6 | 4.6 | 44.1 | 24.3 | 3 |

TABLE 9

UCA and setting time at 76.7° C. (170° F.) for systems with polyamide particles

| Formulation | Time to 0.34 MPa at T (min) | Time to 3.4 MPa at T (min) | Compressive strength after 72 hours (psi) | Setting time (min) |
|---|---|---|---|---|
| B1 | 1695 | 1916 | 1500 | 348 |
| B2 | 525 | 585 | 2377 | 221 |
| B3 | 580 | 699 | 1703 | 170 |
| B4 | 708 | 827 | 1829 | 205 |
| B5 | 661 | 738 | 2167 | 263 |

EXAMPLE 3

Formulations for Cement Slurries with Polypropylene Particles

The cement slurries were composed of Portland Dyckerhoff North Class G cement, polypropylene particles, water, a dispersing agent, a retarder and an anti-foaming agent. The polypropylene used in this Example was produced by ICO Polymer under the trade name ICORENE 9013P. Its density was 0.905 g/cm³. Its initial grain size specification was such that at most 5% of particles had a size of more than 800 μm, 30% had a size of more than 500 μm and less than 5% of the particles had a size of less than 200 μm. For these tests, the particles were also sieved at 300 μm. The polypropylene from Solvay, trade name ELTEX P HV001PF, was also tested but it was found to be difficult to mix and optimize, in particular for our bimodal systems. This can be explained by its very broad grain size specifications since they were in the range 30 μm–1500 μm; this effect was reinforced by the low density of the polypropylene.

The formulations and properties of the cement slurry are shown in Tables 10 to 12; they were all optimized at the same temperature (76.7° C.—170° F.), and a single cement slurry density was selected (14 ppg). The dispersing agent used was a polynaphthalene sulfonate; the retarder was a lignosulfonate. Formulation 1 was constituted by a bimodal mixture (cement+polypropylene particles); formulation 2 was a trimodal mixture (cement+polypropylene particles+ fine particles).

TABLE 10

Formulations for cement slurries with polypropylene particles

| N° | Polypropylene % bwoc | % vol | Fine % bvob | Dispersing agent gps | Retarder gps | Anti-foaming agent gps | ρ g/cm³ | φ |
|---|---|---|---|---|---|---|---|---|
| C1 | 19.4 | 19.4 | 0 | 0.022 | 0.045 | 0.030 | 1.67 | 45% |
| C2 | 23.9 | 23.9 | 10 | 0.059 | 0.046 | 0.039 | 1.65 | 42% |

• % bvob is the abbreviation for "by weight of blend", and is the proportion of fine particles in the mixture of solid cement particles, flexible particles, fines.

TABLE 11

Rheology and free water for systems with polypropylene particles

| Formulation | Rheology after mixing at laboratory temperature PV (mPa.s) | Ty (lbf/ 100 ft²) | Rheology after conditioning at 76.6° C. PV (mPa.s) | Ty (lbf/ 100 ft²) | Free water after 2 hrs (ml) |
|---|---|---|---|---|---|
| C1 | 175 | 6.1 | 228 | 13.1 | 1.5 |
| C2 | 387 | 1.9 | 332 | 18.8 | 0.1 |

TABLE 12

UCA and setting time at 76.7° C. (170° F.) for systems with polypropylene particles

| Formulation | Time to 0.34 MPa at T (min) | Time to 3.4 MPa at T (min) | Compressive strength after 72 hours (psi) | Setting time (min) |
|---|---|---|---|---|
| C1 | 580 | 665 | 1911 | 173 |
| C2 | 863 | 973 | 2089 | 369 |

EXAMPLE 4

Formulations for Cement Slurries with SBR Particles

The cement slurries were composed of Portland Dyckerhoff North Class G cement, SBR particles, water, a dispersing agent and a retarder. The formulations for and properties of the cement slurries are shown in Tables 13 to 15; they were all optimized at the same temperature (76.7° C.—170° F.), and a single cement slurry density (14 ppg) was selected. The dispersing agent used was a polynaphthalene sulfonate; the retarder was a lignosulfonate. Two different grain sizes were tested: 500 μm for formulation N1 and 200 μm for formulation N2.

TABLE 13

Formulations for cement slurries with SBR particles

| | SBR | | Dispersing agent | Retarder | ρ | Porosity of |
|---|---|---|---|---|---|---|
| | % bwoc | % vol | gps | gps | g/cm³ | slurry % |
| D1 | 30.6 | 24.8 | 0.037 | 0.025 | 1.69 | 45 |
| D2 | 20.5 | 16.8 | 0.017 | 0.023 | 1.70 | 52 |

TABLE 14

Rheology and free water for systems with SBR particles

| | Rheology after mixing at laboratory temperature | | Rheology after conditioning at 76.6° C. | | Free water after 2 hrs (ml) |
|---|---|---|---|---|---|
| Formulation | PV (mPa.s) | Ty (lbf/ 100 ft²) | PV (mPa.s) | Ty (lbf/ 100 ft²) | |
| 1 | 156.7 | 5.0 | 185.5 | 17.1 | 0 |
| 2 | 69.4 | 1.8 | 84.3 | 29.5 | 1.5 |

TABLE 15

UCA and setting time at 76.7° C. (170° F.) for systems with SBR particles

| Formulation | Time to 0.34 MPa at T (min) | Time to 3.4 MPa at T (min) | Compressive strength after 72 hours (psi) | Setting time (min) |
|---|---|---|---|---|
| 1 | 373 | 478 | 1535 | 130 |
| 2 | 291 | 492 | 1209 | 200 |

EXAMPLE 5

Optimized Formulations with Polyethylene Particles

The cement slurries were composed of Portland Dyckerhoff North Class G cement, polyethylene particles, water, a dispersing agent, a retarder and an anti-foaming agent. The formulations for and properties of the cement slurries are shown in Tables 16 to 18; they were all optimized at the same temperature (76.7° C.—170° F.), and a single density for the cement slurry (14 ppg) was selected. The dispersing agent used was a polynaphthalene sulfonate.

Formulation 1 contained ground high density polyethylene powder sold by BP Chemicals under the trade name RIGIDEX HD 3840-2WA. Its density was 0.94 g/cm³ and its grain size was less than 500 μm. Formulation 2 also contained polyethylene powder with a density of 0.96 g/cm³ and a grain size of less than 500 μm, but this was a recycled product.

TABLE 16

Formulations for cement slurries with polyethylene particles

| | Polyethylene | | Anti-foaming agent | Dispersing agent (gps) | Retarder | ρ g/cm³ | Porosity of slurry |
|---|---|---|---|---|---|---|---|
| | % bwoc | % vol | | | | | |
| E1 | 24.4 | 24.7 | 0.035 | / | 0.094 | 1.63 | 45% |
| E2 | 25.0 | 24.7 | 0.038 | 0.035 | 0.047 | 1.64 | 45% |

TABLE 17

Rheology and free water for systems with polyethylene particles

| | Rheology after mixing at laboratory temperature | | Rheology after conditioning at 76.6° C. | | Free water after 2 hours (ml) |
|---|---|---|---|---|---|
| Formulation | PV (mPa.s) | Ty (lbf/ 100 ft²) | PV (mPa.s) | Ty (lbf/ 100 ft²) | |
| E1 | 84.4 | 3.7 | 147.8 | 46.6 | 3 |
| E2 | 82.9 | 5.1 | 54.7 | 7.5 | |

TABLE 18

UCA and setting time at 76.7° C. (170° F.) for systems with polyethylene particles

| Formulation | Time to 0.34 MPa at T (min) | Time to 3.4 MPa at T (min) | Compressive strength after 72 hours (psi) | Setting time (min) |
|---|---|---|---|---|
| E1 | 784 | 871 | 2315 | 187 |
| E2 | 291 | 492 | 1209 | 200 |

EXAMPLE 6

Mechanical Properties—bending and Compression

Bending and compression mechanical properties were measured for cement slurries which contained flexible particles. The exact formulations are given in Examples 1 to 6.

The influence of flexible particles on the mechanical properties of a set cement was studied using systems placed under high pressure and temperature in high pressure and high temperature chambers for several days to simulate the conditions encountered in an oil well.

The bending tests were carried out on 3 cm×3 cm×12 cm prisms obtained from cement slurries placed at 76.7° C. (170° F.) and 20.7 MPa (3000 psi) for several days. The compression tests were carried out on cubes with 5 cm (2 inch) sides obtained after several days at 76.7° C. (170° F.) and at 20.7 MPa (3000 psi).

For comparison purposes, systems with no flexible particles with the formulations given in Tables 19 and 20 were included:

- a NET "system" with a density of 1.89 g/cm$^3$ (15.8 ppg) with 0.03 gps of anti-foaming agent (S1) as the sole additive;
- a 1.67 g/cm$^3$ (14 ppg) system extended with bentonite (S2);
- a 1.44 g/cm$^3$ system (12 ppg) extended with sodium silicate (S3).

TABLE 19

Formulations for cement slurries without flexible particles

| N° | Extender % bwoc | Retarder gps | Anti-foaming agent gps | ρ (g/cm$^3$) | Porosity of slurry % |
|---|---|---|---|---|---|
| S1 | 0 | / | 0.03 | 1.89 | 58 |
| S2 | 4 | 0.08 | 0.03 | 1.68 | 68 |
| S3 | 1.7 | / | 0.03 | 1.44 | 79 |

TABLE 20

Rheology and free water for systems without flexible particles

| Formulation | Rheology after mixing at laboratory temperature | | Rheology after conditioning at 76.6° C. | | Free water after 2 hours (ml) |
|---|---|---|---|---|---|
| | PV (mPa.s) | Ty (lbf/100 ft$^2$) | PV (mPa.s) | Ty (lbf/100 ft$^2$) | |
| S1 | 30.8 | 23.3 | / | / | 3.5 |
| S2 | 12.7 | 3.5 | 11.2 | 26.7 | 3 |
| S3 | 9.2 | 9.9 | 8.5 | 8.5 | 0 |

The results are shown in Tables 21 and 22. Table 21 concerns the bending strength (rupture modulus Mr and bending Young's modulus Ef). It also shows the number of days of cure under pressure and temperature. Table 22 shows the compressive strengths (compressive strength Cs and compression Young's modulus Ec).

The bending strength was easier to measure than the tensile strength. It was empirically estimated that the bending strength was twice as high as the tensile strength.

The bending and compression tests were used to calculate the quantity of energy released at rupture (obtained by integrating the stress-strain curve for a displacement in the range 0 to the maximum displacement, of the load (corresponding to rupture).

Each property is represented.as a function of the concentration of flexible particles expressed as the % by volume (FIGS. 1–6).

Figure 1:
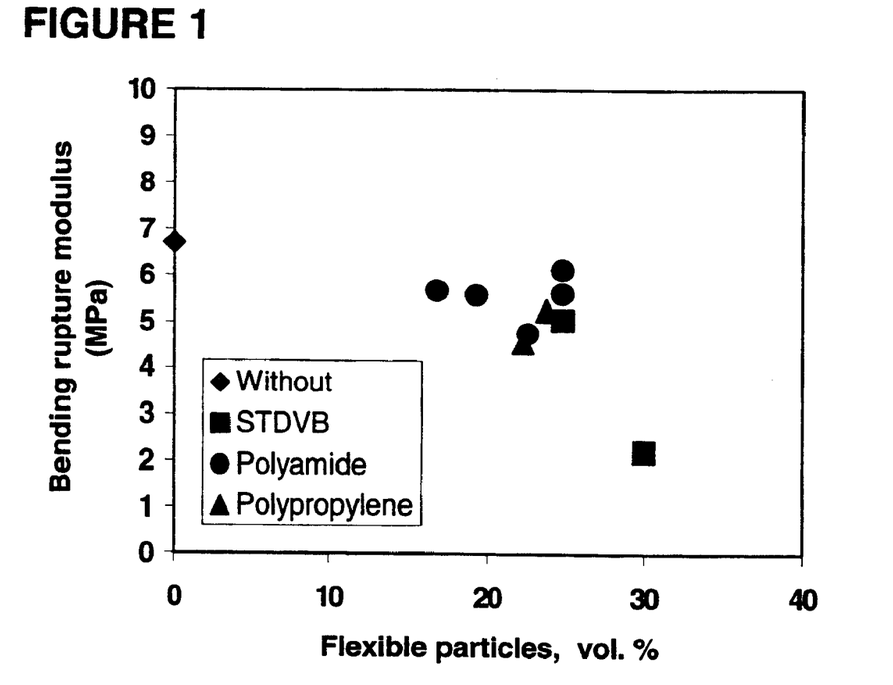
FIG. 1 plots the rupture modulus vs. the concentration of flexible particles (in %vol.), for different types of particles.
Figure 2:
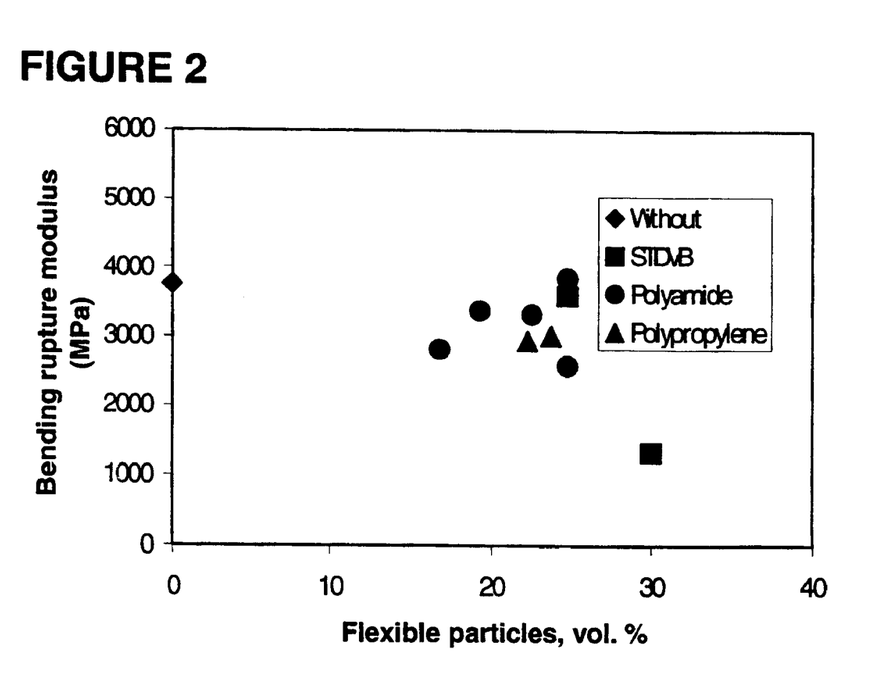
FIG. 2 plots the Young/s modulus vs. the concentration of flexible particles (in %vol.) for different types of particles.
Figure 3:
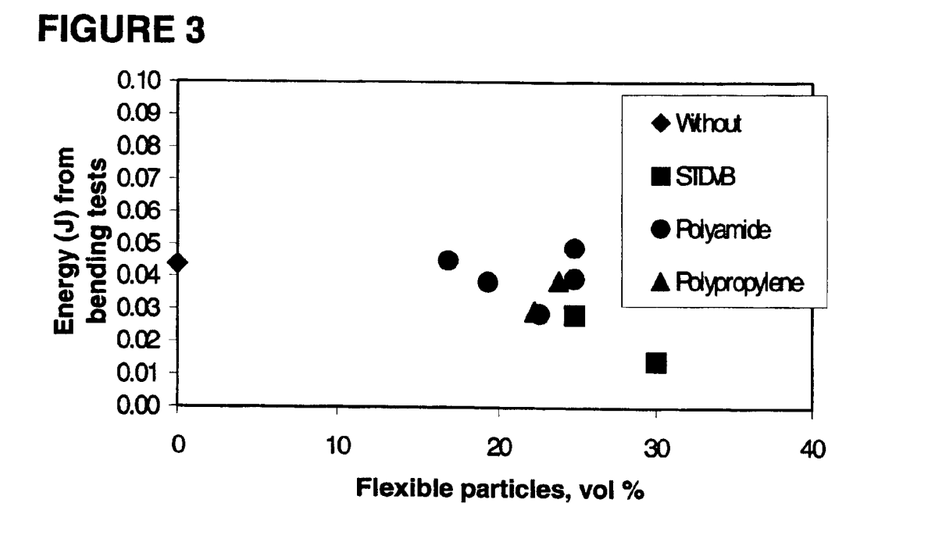
FIG. 3 plots the bending Young's modulus vs. the concentration of flexible particles (in %vol.); for different types of particles.
Figure 4:
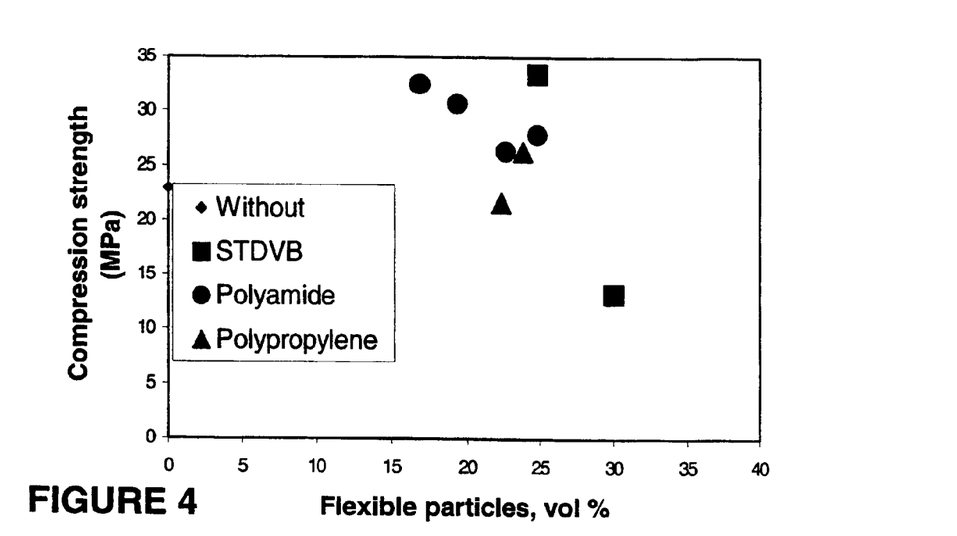
FIG. 4 plots compressive strength vs. the concentration of flexible particles (in %vol.); for different types of particles.
Figure 5:
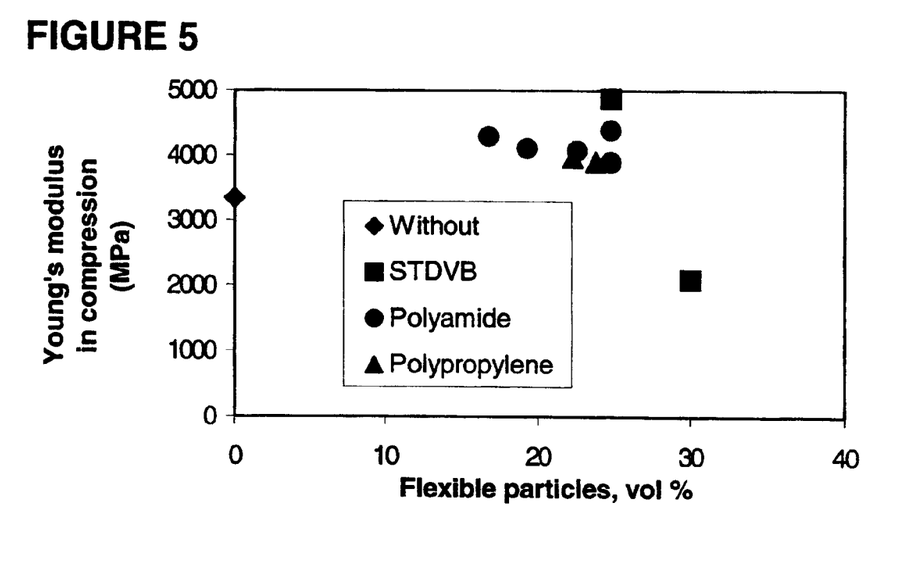
FIG. 5 plots the compression Young's modulus vs. the concentration of flexible particles (in %vol.); for different types of particles.

The results obtained for the flexible particles show that, for equal densities, adding particles simultaneously resulted in:

- a reduction in the rupture modulus (FIG. 1);
- a reduction in the bending Young's modulus (FIG. 2), but this tendency was not as clear for polyamide particles or for STDVB particles; the same was true for the compression Young's modulus (FIG. 5);
- a reduction in the bending energy for STDVB (FIG. 3);
- a reduction in the compressive strength for SBR particles, the contrary for polyamides regardless of the mixture or grain size. For polypropylene, different effects were observed: in the bimodal system, the compressive strength.decreased slightly while in the trimodal system, the compressive strength increased; STDVB increased the compressive strength for 25% by volume (FIG. 4).

TABLE 21

Bending results with flexible particles

| Particles | Formulation | Number of days | Mr (MPa) | Ef (MPa) | Mr/Ef (×1000) | Energy (J) |
|---|---|---|---|---|---|---|
| None | S1 | 5 | 8.47 | 5021.6 | 1.69 | 0.0706 |
| None | S2 | 5 | 6.69 | 3758.8 | 1.81 | 0.0437 |
| None | S3 | 3 | 1.19 | 504.2 | 2.37 | 0.0101 |
| STDVB | A1 | 3 | 5.04 | 3595.0 | 1.44 | 0.0285 |
| STDVB | A2 | 5 | 2.20 | 1338.6 | 1.68 | 0.0142 |
| Polyamide | B1 | 5 | 5.60 | 2580.0 | 2.18 | 0.0490 |
| Polyamide | B2 | 4 | 5.57 | 3377.5 | 1.65 | 0.0386 |
| Polyamide | B3 | 3 | 6.13 | 3852.4 | 1.59 | 0.0397 |
| Polyamide | B4 | 5 | 5.67 | 2813.4 | 2.04 | 0.0450 |
| Polyamide | B5 | 4 | 4.75 | 3320.9 | 1.43 | 0.0288 |
| Polypropylene | C1 | 5 | 4.53 | 2941.2 | 1.55 | 0.0296 |
| Polypropylene | C2 | 5 | 5.25 | 3019.6 | 1.75 | 0.0389 |
| SBR | D1 | 3 | 3.41 | 1674.6 | 2.10 | 0.0285 |
| SBR | D2 | 3 | 4.12 | 2085.8 | 2.00 | 0.0326 |
| Polyethylene | E1 | 4 | 4.21 | 2066.5 | 2.07 | 0.0343 |
| Polyethylene | E2 | 3 | 4.22 | 2481.8 | 1.74 | 0.0305 |

TABLE 22

Compression results with flexible particles

| Particles | Formulation | CS (MPa) | Ec (MPa) | CS/Ec (×1000) | Energy (J) |
|---|---|---|---|---|---|
| None | S1 | 36.6 | 6257.3 | 5.85 | 16.22 |
| None | S2 | 22.9 | 3341.8 | 6.88 | 12.97 |
| None | S3 | 3.2 | 519.6 | 6.24 | 1.88 |
| STDVB | A1 | 33.5 | 4880.7 | 6.88 | 18.84 |
| STDVB | A2 | 13.3 | 2093.3 | 6.39 | 6.23 |
| Polyamide | B1 | 27.9 | 3898.7 | 7.15 | 23.83 |
| Polyamide | B2 | 27.9 | 4391.6 | 6.37 | 18.32 |
| Polyamide | B3 | 30.7 | 4117.7 | 7.46 | 24.55 |
| Polyamide | B4 | 32.5 | 4295.7 | 7.59 | 22.01 |
| Polyamide | B5 | 26.4 | 4080.1 | 6.49 | 19.61 |
| Polypropylene | C1 | 21.6 | 3977.2 | 5.49 | 14.28 |
| Polypropylene | C2 | 26.3 | 3904.2 | 6.77 | 18.49 |
| SBR | D1 | 10.11 | 1614.59 | 6.38 | 5.50 |
| SBR | D2 | 14.52 | 2659.14 | 5.50 | 7.19 |
| Polyethylene | E1 | 22.89 | 2863.17 | 8.01 | 20.65 |
| Polyethylene | E2 | 20.30 | 2688.19 | 7.58 | 19.53 |

To compare these different systems, a flexibility criterion (MT) was defined: a cement was considered to be better if the ratio between its bending rupture modulus and its bending Young's modulus was higher.

Figure 6:
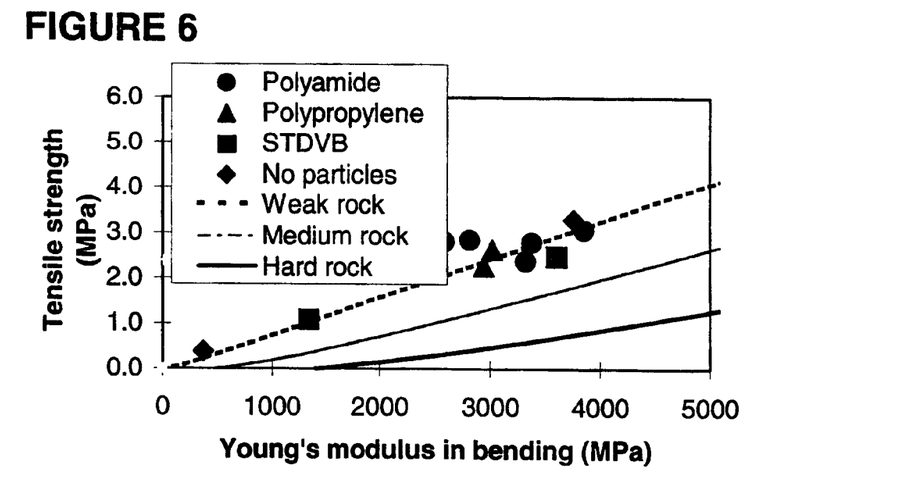
FIG. 6 plots the tensile strength of the cement vs. the bending Young's modulus of the cement, showing the requirements for three rock types (hard, medium and weak rock)

This flexibility criterion can, for example, be seen in FIG. 6 where the tensile strength of the cement is shown as a function of the bending Young's modulus of the cement. FIG. 6 was obtained for the following casing geometry: external diameter 21.6 cm (8½"), internal diameter 17.8 cm (7"), grade 52 kg/m (35 lb/ft). The pressure increase in the well was assumed to be 34.5 MPa (5000 psi).

In this Figure, the minimum condition required is traced for three rock types (hard rock, medium rock and weak rock). Each curve obtained defines the minimum condition required to obtain good cement strength for the geometry and the pressure increase selected for this example. For a given rock, a cement was said to be satisfactory if these characteristics (tensile strength and bending Young's modulus) placed it above the curve.

It appears that the different formulations satisfied the flexibility criterion. However, these tendencies are directly linked to a reduction in density resulting from an increase in the concentration of flexible particles and thus in the porosity of the system. Thus porosity, measurements were carried out and will be developed in the following example.

EXAMPLE 7

Porosity Measurements

The porosity of different cement samples obtained after several days of curing at 76.7° C. (170° F.) and at 20.7 MPa (3000 psi) was measured for the different formulations.

The following principle was applied in measuring the porosity measurement. Cylinders ½ inch in diameter and 1 cm long were cored from the cement sample which had been hardened at temperature and pressure. They were dried for two weeks in a freeze drier and during that time the weight loss was studied as a function of time. When the sample was dry (corresponding to a time-stable weight), the real volume or framework volume Vs was measured using a helium pycnometer; the mean volume Vb was obtained from the external dimensions of the cylinder. The difference in the two volumes (Vb−Vs) gave the void volume and thus the porosity $\Phi$ of the material which was accessible to the helium.

The porosity $\Phi$ of the slurry was the % by volume of water and liquid additives in the formulation. For each formulation, a volume percentage of flexible particles was calculated, and the effective porosity $\Phi$ was defined as the sum of the porosity of the hardened cement and the volume percentage of the flexible particles.

Figure 7:
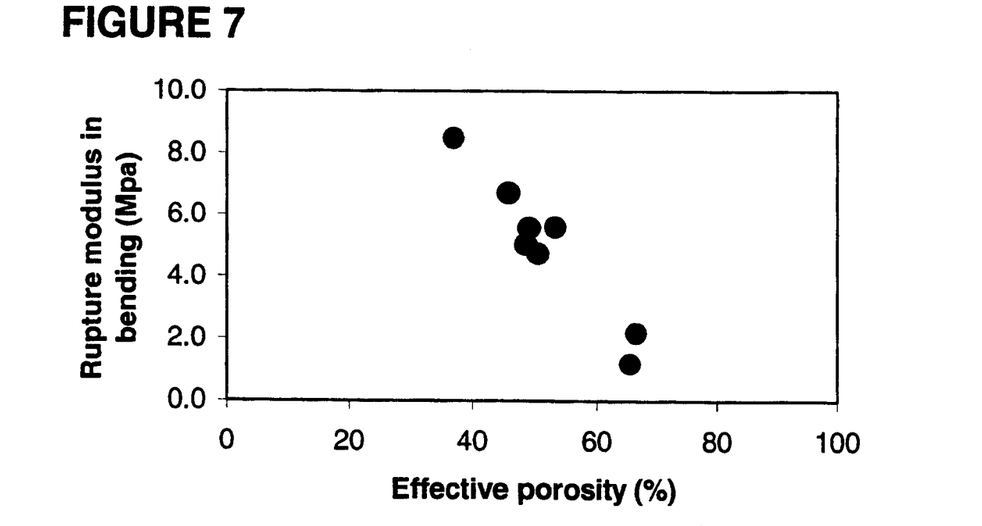
FIG. 7 plots the rupture modulus in bending (in MPa) vs. the effective porosity (in %), defined as the sum of the porosity of the hardened cement and the volume percentage of the flexible particles.
Figure 8:
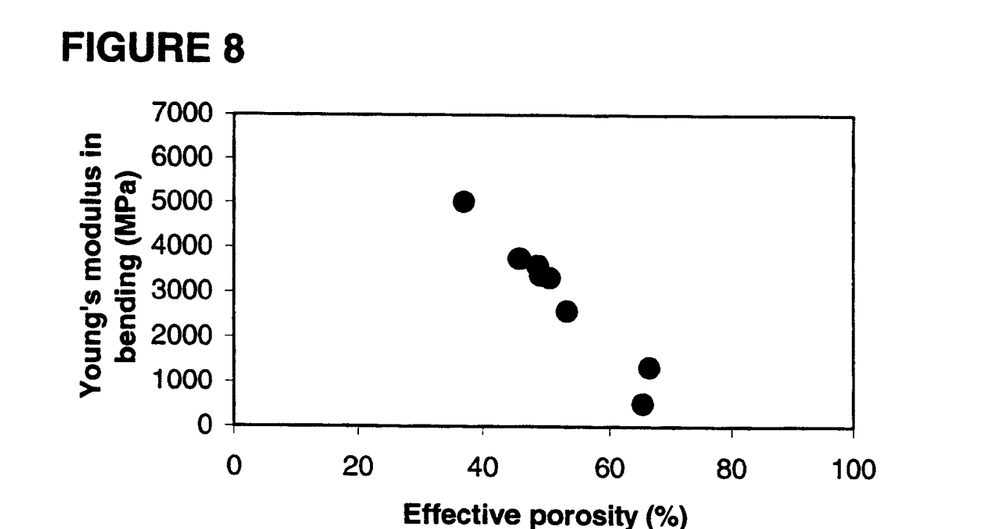
FIG. 8 plots the Young's modulus in bending (in MPa)vs. the effective porosity (in %).

The results are shown in Table 23. It can be seen that the bending Young's modulus decreased almost linearly as a function of the effective porosity with a saturation threshold after 70% porosity (FIG. 7). The same applies to the bending rupture modulus (FIG. 8).

In conclusion, it appears that flexible particles can reduce the slurry density and thus act on the flexibility of the system to a minor extent. Primarily, flexible particles do not improve the above mechanical properties of cements.

TABLE 23

Porosity results

| Flexible particles | N° | $\phi$ slurry (1) % | $\phi$material (2) % | Particle volume (3) % | $\phi$effective (2) + (3) % |
|---|---|---|---|---|---|
| None | S1 | 60 | 36.9 | 0 | 36.9 |
| None | S2 | 68 | 45.7 | 0 | 45.7 |
| None | S3 | 79 | 65.5 | 0 | 65.5 |
| STDVB | A1 | 45 | 23.6 | 24.8 | 48.4 |
| STDVB | A2 | 50 | 36.6 | 30.0 | 66.6 |
| Polyamide | B1 | 45 | 28.3 | 24.8 | 53.1 |
| Polyamide | B2 | 45 | 29.6 | 19.3 | 48.9 |
| Polyamide | B5 | 45 | 27.7 | 22.6 | 50.30 |

EXAMPLE 8

Measurement of Poisson Ratio

The Poisson ratio was measured for different formulations with flexible particles to evaluate the compressibility of these systems. The compositions of the different formulations were given in the preceding examples.

When a cement sample is subjected to a normal compressive force, while remaining within the elastic region of the material, the longitudinal fibers of the sample are shortened the amount of which depends on the Young's modulus of the material (and on the stress applied and on the geometry of the sample). Simultaneously, the transverse dimension of the sample is elongated. The ratio of the transverse deformation (relative to the transverse dimension) to the longitudinal deformation (longitudinal relative variation) is a dimensionless coefficient known as the Poisson ratio.

In our tests, the loading rate was 1 kN/min and the samples were cylindrical, with a diameter of 30 mm and a length of 60 mm. The longitudinal deformation was measured using LVDT type displacement gauges; the transverse deformation was measured using a strain gauge.

The samples were placed in a chamber filled with water for several days at 76.7° C. (170° F.). and at 3000 psi. These were the same aging conditions as those used to prepare the samples for the bending tests, for example. After curing, the samples were kept permanently submerged and were simply drained before carrying out the mechanical tests which were then carried out on the moist samples.

The results are shown in Table 24 and demonstrate that adding flexible particles does indeed lead to an increase in the Poisson ratio of the hardened cement, and because of this, to a reduction in the compressibility of the hardened cement. Because of this lower compressibility, a cement reinforced with flexible particles can more readily distribute lateral forces or can more readily distribute forces in response to a compressive stress, which is very favorable to good zone isolation.

TABLE 24

Poisson ratio results

| Particles | N° | $\rho(g/cm^3)$ | $\upsilon$ |
|---|---|---|---|
| none | S1 | 1.89 | 0.15 |
| none | S2 | 1.67 | 0.17 |
| STDVB | A1 | 1.67 | 0.21 |
| Polyamide | B1 | 1.67 | 0.20 |
| Polyamide | B2 | 1.67 | 0.22 |
| Polyamide | B3 | 1.67 | 0.21 |
| Polyamide | B5 | 1.67 | 0.19 |
| Polypropylene | C2 | 1.67 | 0.22 |

EXAMPLE 9

Permeability Measurements

Cement samples were generated under pressure (20.7 MPa—3000 psi) and temperature (76.7° C.) under the same conditions as those used for the bending or compression tests, and for the same time. The hardened material obtained was cored into the following dimensions: 51.4 mm in diameter and 25 mm in length.

The moist sample was placed in a Hassler type cell which could apply a confinement pressure of 10 to 100 bars to the sample. A small constant flow of water (in the range 0.005 ml/min to 1 ml/min) was sent through the sample by means of a chromatography pump. The differential pressure either side of the sample was measured and recorded. The value recorded was that corresponding to equilibrium.

The permeability K in milliDarcy was calculated using Darcy's law: K=14700

$$\frac{Q\,\mu L}{AP}$$

where Q is the flow rate expressed in ml/s, $\mu$ is the viscosity of water in cP, L is the length of the sample in cm, A is the surface area of the sample in cm$^2$ and P is the differential pressure in psi.

The results for the different formulations are shown in Table 25 and demonstrate that, at a constant density, adding flexible particles reduces the permeability of the cement.

TABLE 25

Permeability results

| Particle | | $\rho$ g/cm$^3$ | Flexible particles % bwoc | Permeability to water, mD |
|---|---|---|---|---|
| None | S1 | 1.89 | 0 | 0.001 |
| None | S2 | 1.67 | 0 | 0.008 |
| None | S3 | 1.44 | 0 | 0.138 |
| STDVB | A2 | 1.44 | 50.9 | 0.031 |
| Polyamide | C1 | 1.67 | 29.4 | 0.001 |

EXAMPLE 10

Impact Tests

Impact tests were carried out on cement samples. These tests consisted of allowing a projectile to fall onto disks of set cement from a height of 1 meter. The disks were circular with a diameter of 70 mm and a thickness of 10 mm. The dynamic load was measured and recorded as a function of time.

The cement containing no flexible particles behaved as a fragile material land the energy absorbed by the sample was estimated to be less than 10 joules. The energy absorbed by cements formulated with flexible particles was considerably improved, as shown in Table 26.

TABLE 26

Results of impact with flexible particles

| Particle | | $\rho$ g/cm$^3$ | Flexible particles % bwoc | Energy (J) |
|---|---|---|---|---|
| None | S1 | 1.89 | 0 | 7.4 |
| None | S3 | 1.44 | 0 | 4.0 |
| STDVB | A1 | 1.67 | 27.8 | 23.4 |

This good shock behavior is particularly important when cementing multi-branch lateral wells.

EXAMPLE 11

Expansion Measurements

Linear expansion of cement slurries during setting at a temperature simulating the well conditions was measured in an annular expansion mold. This mold was constituted by two concentric rings, respectively with a diameter of 51 mm, and 89 mm, placed between two flat disks 22 mm apart. The external ring had longitudinal slits, and included two scales located either side of the slit enabling the distance to be measured during expansion of the cement. The cement slurry to be studied was poured into the mold, and the mold was then placed in a water bath thermostatted at 76.7° C. (170° F.). The slurry remained in contact with the water throughout the test.

The expansion results are shown in Table 27 and demonstrate that a slurry containing flexible particles has expansion properties.

TABLE 27

Expansion results

| Flexible particle | | Particle % bwoc | Linear expansion, % after 1 day | Linear expansion, % after 2 days | Linear expansion, % after 7 days |
|---|---|---|---|---|---|
| None | S2 | 0 | ≦0 | ≦0 | ≦0 |
| Polyamide | B1 | 29.4 | 0.02 | / | 0.16 |
| Polyamide | B5 | 24.9 | 0.11 | 0.13 | 0.3 |
| ST DVB | A1 | 27.8 | 0.01 | 0.08 | 0.09 |

The expansion behavior is of particular interest for preventing the cement from separating from the casing and to prevent it from separating from the formation. This behavior is more significant when a cement is flexible and thus is confined by the rock.

What is claimed is:

1. A cementing composition, comprising:
    (i) an hydraulic binder; and
    (ii) reinforcing particles having an average grain size not exceeding 500 $\mu$m, and being formed from a flexible material selected from the group consisting of polyamide, polypropylene, polyethylene, styrene butadiene and styrene divinylbenzene and having a Poisson ratio of more than 0.3; and
    (iii) water in sufficient quantity to form a pumpable slurry when mixed with the binder and reinforcing particles.
2. A cementing composition as claimed in claim 1, wherein the reinforcing particles have an average grain size in the range 100 $\mu$m to 400 $\mu$m.
3. A cementing composition as claimed in claim 1, wherein the reinforcing particles are formed from a material having a Young's modulus of less than 5000 MPa.
4. A cementing composition as claimed in claim 3, wherein the particles are formed from a material having a Young's modulus of less than 3000 MPa.
5. A cementing composition as claimed in claim 4, wherein the particles are formed from a material having a Young's modulus of less than 2000 MPa.
6. A cementing composition as claimed in claim 1, wherein the density of the reinforcing particles is less than 1.5 g/cm$^3$.
7. A cementing composition as claimed in claim 6, wherein the density of the reinforcing particles is less than 1.2 g/cm$^3$.
8. A cementing composition as claimed in claim 1, wherein the material forming the reinforcing particles is selected from the group consisting of polyamide, polypropylene, polyethylene, styrene butadiene and styrene divinylbenzene.
9. A cementing composition as claimed in claim 1, further comprising at least one additive selected from the group consisting of suspension agents, dispersing agents, antifoaming agents, retarders, setting accelerators, fluid loss control agents, gas migration control agents, and expansion agents.
10. A cementing composition as claimed in claim 1, wherein the reinforcing particles comprise 5% to 40% of the total volume of the slurry.

11. A cementing composition as claimed in claim 1, wherein the hydraulic binder comprises a cement.

12. A well cementing composition, comprising:
(i) a cement;
(ii) reinforcing particles having an average grain size in the range 80 μm to 500 μm, and being formed from a flexible material having a Poisson ratio of more than 0.3, the flexible material being selected from the group consisting of polyamide, polypropylene, polyethylene, styrene butadiene and styrene divinylbenzene; and
(iii) water in sufficient quantity to form a pumpable slurry when mixed with the binder and reinforcing particles.

13. A cementing composition as claimed in claim 12, further comprising at least one additive selected from the group consisting of suspension agents, dispersing agents, anti-foaming agents, retarders, setting accelerators, fluid loss control agents, gas migration control agents, and expansion agents.

14. A cementing composition as claimed in claim 12, wherein the reinforcing particles comprise 5% to 40% of the total volume of the slurry.

* * * * *